(12) United States Patent
Kamikawa (10) Patent No.: US 9,130,940 B2
(45) Date of Patent: Sep. 8, 2015

(54) NETWORK SYSTEM

(71) Applicant: HITACHI CABLE, LTD., Tokyo (JP)

(72) Inventor: Taketo Kamikawa, Funabashi (JP)

(73) Assignee: HITACHI METALS, LTD., Tokyo (JP)

(*) Notice: Subject to any disclaimer, the term of this patent is extended or adjusted under 35 U.S.C. 154(b) by 0 days.

(21) Appl. No.: 13/734,450

(22) Filed: Jan. 4, 2013

(65) Prior Publication Data

US 2013/0185771 A1 Jul. 18, 2013

(30) Foreign Application Priority Data

Jan. 17, 2012 (JP) .................................. 2012-007287

(51) Int. Cl.
*H04L 29/06* (2006.01)

(52) U.S. Cl.
CPC ...................................... *H04L 63/10* (2013.01)

(58) Field of Classification Search
CPC ..... H04L 12/00; H04L 67/00; H04L 63/0884; H04L 63/10; H04L 29/06; H04W 16/00; H04W 12/06
USPC ........... 713/155, 161, 168; 726/2, 4; 380/229, 380/232, 247, 258
See application file for complete search history.

(56) References Cited

U.S. PATENT DOCUMENTS

| | | | |
|---|---|---|---|
| 6,785,272 B1 | 8/2004 | Sugihara | |
| 7,707,293 B2 * | 4/2010 | Zhang | 709/227 |
| 7,813,511 B2 * | 10/2010 | Leung et al. | 380/281 |
| 7,849,168 B2 * | 12/2010 | Utsunomiya et al. | 709/221 |
| 8,713,201 B2 * | 4/2014 | Smith et al. | 709/246 |
| 2005/0271044 A1 * | 12/2005 | Hsu et al. | 370/360 |
| 2006/0236377 A1 * | 10/2006 | Metke et al. | 726/4 |

(Continued)

FOREIGN PATENT DOCUMENTS

JP 2007-124673 A 5/2007

OTHER PUBLICATIONS

Part 2 Virtualization of Network: Virtualizing Communication Channels and Devices for Improving the Efficiency of the Network Operation and Management, No. 101, Nikkei Business Publications, Inc., Sep. 2008, pp. 52-59.

(Continued)

*Primary Examiner* — Chau Le
*Assistant Examiner* — Muhammad Chaudhry
(74) *Attorney, Agent, or Firm* — Foley & Lardner LLP (57) ABSTRACT

A network system includes network relay devices including a master device for administrating the network system, and a member device to be administrated by the master device. When the master device receives an authentication request from an external terminal connected to the network system, the master device performs an authentication processing for authorizing or denying the authentication request. When the authentication request is authorized, one network relay device connected to the external terminal in the network system performs a communication-authorizing processing for authorizing a communication between the external terminal and the one network relay device, and performs a transmission processing for transmitting a communication authorization data to an other network relay device which is not connected to the external terminal in the network system. When the other network relay device receives the communication authorization data, the other network relay device performs the communication-authorizing processing.

7 Claims, 8 Drawing Sheets

(56) References Cited

U.S. PATENT DOCUMENTS

2007/0250713 A1* 10/2007 Rahman et al. .............. 713/171
2012/0084840 A1* 4/2012 Higuchi et al. .................. 726/4
2013/0064066 A1* 3/2013 Ghosh et al. ................. 370/216

OTHER PUBLICATIONS

Genba Ito, Understandable Communication Flow, Illustrated Switch & a Router, Network Magazine, No. 13, Apr. 2008, pp. 120-127, vol. 13, Japan ASCII Corporation.
Japanese Office Action, Nov. 28, 2015, 5 pages.

* cited by examiner

NETWORK SYSTEM

The present application is based on Japanese patent application No. 2012-007287 filed on Jan. 17, 2012, the entire contents of which are incorporated herein by reference.

BACKGROUND OF THE INVENTION

1. Field of the Invention

The present invention relates to a network system.

2. Description of the Related Art

As a prior art, Japanese Patent Laid-Open No. 2007-124673 (JP-A 2007-124673) discloses a switching system equipped with a stack function. Here, the "stack" function is a function for operating a plurality of switches connected to each other like a virtual single switch. In a single switch, the number of ports is limited. By adopting the stack function, it is possible to substantially increase the number of ports. Since it is possible to centrally administrate a plurality of switches, the administration property is improved as compared to the case of individually administrating a plurality of switches.

SUMMARY OF THE INVENTION

In the switching system disclosed by JP-A 2007-124673, one switch in the system is designated as a master unit, while the remaining switches are designated as the slave units. In the case where such a switching system is implemented with an authentication function of an external terminal, the master unit performs authentication process collectively. In such a switching system equipped with the authentication function, if the external terminal connected to a unit in the switching system is transferred and connected to the other unit, the authentication processing should be performed again.

Accordingly, it is an object of the present invention to provide a network system comprising a plurality of network relay devices connected to each other that function as a virtual single network relay device, in which an external terminal which has been once authenticated can be transferred between the network relay devices without performing the authentication processing once again.

According to a feature of the invention, a network system comprises:

network relay devices connected to each other to function as a virtual single network relay device, the network relay devices including:

a master device for administrating the network system; and a member device to be administrated by the master device;

in which when the master device receives an authentication request from an external terminal connected to the network system, the master device performs an authentication processing for authorizing or denying the authentication request, in which when the authentication request is authorized, one network relay device connected to the external terminal in the network system performs a communication-authorizing processing for authorizing a communication between the external terminal and the one network relay device, and performs a transmission processing for transmitting a communication authorization data to an other network relay device which is not connected to the external terminal in the network system, in which when the other network relay device receives the communication authorization data, the other network relay device performs the communication-authorizing processing.

In the network system, when the member device receives the authentication request from the external terminal, the member device may perform the authentication processing instead of the master device.

In the network system, when the one network relay device receives the authentication termination request from the external terminal, the one network relay device may perform a communication-denying processing for denying communication between the external terminal and the one network relay device, and perform a transmission processing for transmitting the communication non-authorization data to the other network relay device in the network system, and when the other network relay device receives the communication non-authorization data, the other network relay device may perform the communication-denying processing.

In the network system, at least one of the network relay devices may include a transfer-adapted connection port for connecting the external terminal when the external terminal is transferred from the one network relay device, and the one network relay device may perform the transmission processing for the at least one of the network relay devices including the transfer-adapted connection port.

In the network system, the at least one of the network relay devices including the transfer-adapted connection port may transmit a data relating to the transfer-adapted connection port thereof to an other network relay device in the network system.

In the network system, at least one of the network relay devices may include a transfer-adapted connection port for connecting the external terminal when the external terminal is transferred from the one network relay device, and a network relay device in the network system which includes no transfer-adapted connection port does not perform the communication-authorizing processing even when receiving the communication authorization data.

Further, each of the network relay devices may register an external terminal identification data therein when performing the communication-authorizing processing, and may delete the external terminal identification data therefrom when performing the communication-denying processing.

In the network system, the one network relay device transmits an updated data to the other network relay device in the network system each time when a data to be updated in the one network relay device but not updated in the other network relay device is updated in the one network relay device.

Effect of the Invention

According to the present invention, it is possible to provide a network system comprising a plurality of network relay devices connected to each other that function as a virtual single network relay device, in which an external terminal which has been once authenticated can be transferred between the network relay devices without performing the authentication processing again.

BRIEF DESCRIPTION OF THE DRAWINGS

Next, embodiments of the present invention will be described in conjunction with appended drawings, wherein:

FIG. 2 is a block diagram showing a schematic configuration of a master device 22a;

DETAILED DESCRIPTION OF THE EMBODIMENTS

Next, the embodiments according to the present invention will be described in more detail in conjunction with the appended drawing.

First Embodiment

Figure 1:
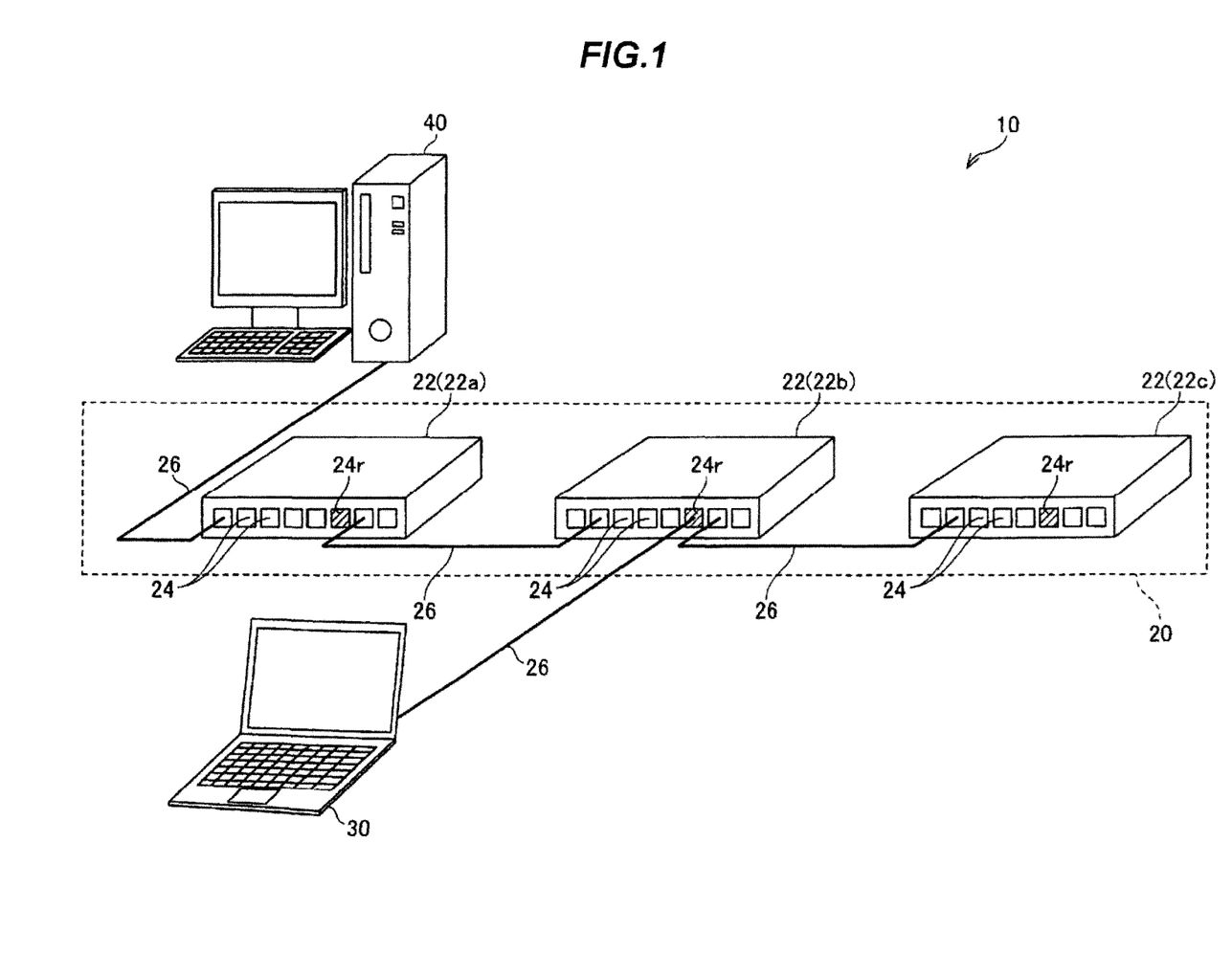
FIG. 1 is a diagram showing a network 10 comprising a network system 20 in the first embodiment according to the invention.

FIG. 1 is a diagram showing a network 10 comprising a network system 20 in the first embodiment according to the invention. The network 10 comprises the network system 20, an external terminal 30, and an authentication server 40.

(Network System)

The network system 20 is a network system which functions as a virtual single network system by connecting a plurality of network relay devices 22 (22a to 22c).

Each network relay device 22 is a switch having a plurality of ports 24. Of the plurality of ports 24, a third port (from the right side in FIG. 1) is set as a roaming port 24r. Here, the roaming port 24r is a transfer-adapted connection port to which the external terminal is connected when the external terminal 30 is transferred, and each network relay device 22 is equipped with the roaming port 24r.

Respective network relay devices 22 are connected to each other by a communication cable 26. The communication cable 26 comprises a cable body and connectors fixed at both ends of the cable body.

The network relay devices 22 include a master device 22a for administrating the network system 20, and a first member device 22b and a second member device 22c that are administrated by the master device 22a.

(External Terminal)

The external terminal 30 is a data processing apparatus (authentication device) to be operated by a user, and it is possible to adopt e.g. a notebook type personal computer as the external terminal 30. The external terminal 30 and the first member device 22b are connected to each other by the communication cable 26. In an example shown in FIG. 1, the first member device 22b and the external terminal 30 are directly connected to each other by the communication cable 26 however the invention is not limited thereto. The first member device 22b and the external terminal 30 may be connected indirectly via a relay device such as a hub.

At present, the external terminal 30 is connected to the roaming port 24r of the first member device 22b. In the case where the external terminal 30 is transferred to the master device 22a, the external terminal 30 will be connected to the roaming port 24r of the master device 22a. In the case where the external terminal 30 is transferred to the second member device 22c, the external terminal 30 is connected to the roaming port 24r of the second member device 22c.

(Authentication Server)

The authentication server 40 is a server for determining to authorize or deny the external terminal 30 to login the network 10, and is connected to the master device 22a through the communication cable 26. As the authentication server 40, e.g. RADIUS (Remote Authentication Dial-in User Service) server may be applied.

Figure 2:
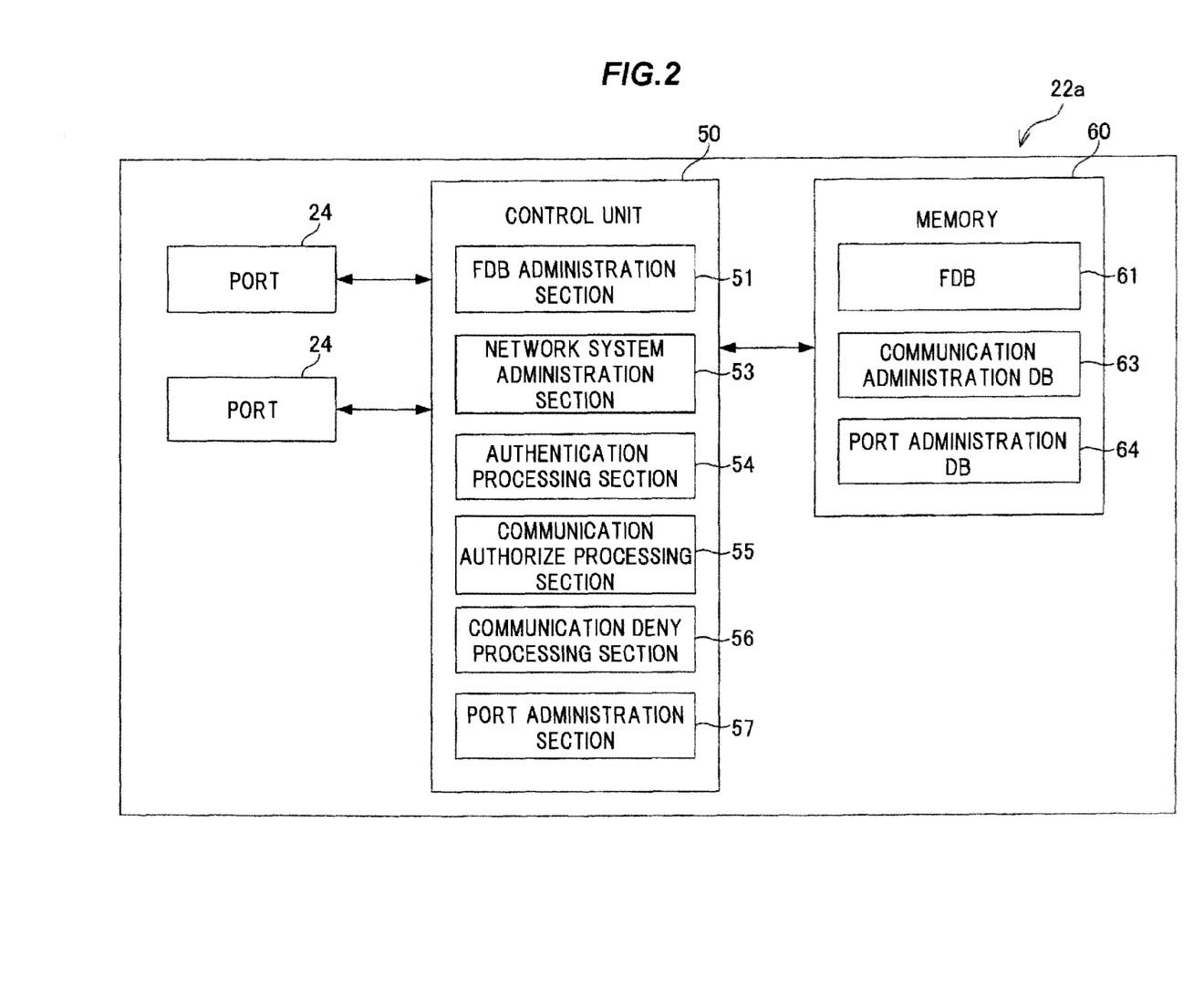

FIG. 2 is a block diagram showing a schematic configuration of the master device 22a.

The control unit 50 is connected to the ports 24 and a memory 60. The control unit 50 and the memory 60 cooperate to control the network system 20 and the master device 22a.

Further, when receiving a MAC (Media Access Control) frame from the port 24, the control unit 50 references a FDB (Forwarding Data Base) 61 which is stored in the memory 60, identifies which port 24 is used to transmit the MAC frame, and transmits (outputs) the MAC frame only to the identified (specified) port.

Further, the control unit 50 comprises an FDB administration section 51, a network system administration section 53, an authentication processing section 54, a communication authorize processing section 55, a communication deny processing (i.e. deny-processing, non-authorization processing) section 56, and a port administration section 57.

(FDB Administration Section)

The FDB administration section 51 performs a processing for administrating various types of data that are registered in the FDB 61. The FDB administration section 51 performs a process of reading a source MAC address included in the MAC frame to be processed, which is received by the port 24, and a process of registering the source MAC address in the FDB 61 if the source MAC address is not registered, and the like.

(Network System Administration Section)

The network system administration section performs a process of administrating the network system 20. More specifically, the network system administration section 53 administrates the data of the first member device 22b and the second member device 22c under the network system 20. For example, in the case where a member device is newly added to the network system 20 or in the case where the first member device 22b and the second member device 22c under the network system 20 is removed, the administration data of the network system 20 will be updated. According to the function of the network administration section 53 of the master device 22a, it is possible to administrate the plurality of network relay devices 22 as a virtual single network relay device.

(Authentication Processing Section)

The authentication processing section 54 performs an authentication process for authorizing or denying a login request when receiving the login request (authentication request) from the external terminal 30 which is connected to the network system 20. More specifically, the authentication processing section 54 transmits a query to the authentication server 40, and waits for a response from the authentication server 40.

As shown in FIG. 1, the external terminal 30 is connected to the first member device 22b at present (i.e. in an initial state). The external terminal 30 however may be connected to the master device 22a or the second member device 22c. When receiving the login request from the external terminal 30 connected to the master device 22a, the master device 22a immediately transmits the query to the authentication server 40 and performs the authentication processing.

On the other hand, when receiving a login request from the external terminal 30 connected to the first member device 22b or the second member device 22c, the master device 22a receives the login request which has been transferred from the first member device 22b or the second member device 22c, and transmits a query to the authentication server 40 based on the login request that has been transferred.

(Communication Authorize Processing Section)

The communication authorize processing section 55 performs a communication authorize processing (i.e. communication-authorizing processing). Here, the steps in the communication authorize processing is different between the case where the external terminal 30 is connected to its own device (i.e. the device itself) and the case where the external terminal 30 is connected to the other device.

(The Case where the External Terminal 30 is Connected to its Own Device)

In response to a login response for authorizing the login request transmitted from the authentication server 40 (see FIG. 1), the communication authorize processing section 55 recognizes that the login request has been authorized, then performs the communication authorize processing for authorizing the communication between its own device and the external terminal 30. More specifically, the communication authorize processing section 55 registers a login terminal data (i.e. communication authorization data) for identifying the external terminal 30 in the communication administration database (DB) 63, and configures a VLAN (Virtual Local Area Network) connection and a packet filter based on the login terminal data.

The "login terminal data" is a data including a MAC address, an IP (Internet Protocol) address, a VID (VLAN ID), the port number of the roaming port 24r, an elapsed time period since login (time data), an elapsed time period since a receipt of the last frame (aging data), a user ID (Identification), and the like. By registering the login terminal data, it is possible to accurately identify the data of the external terminal 30.

Before the packet filter is configured, all the communication with the external terminal 30 is shut off. After the packet filter is configured, the communication with the external terminal 30 is authorized.

Further, the communication authorize processing section 55 performs a process for updating the data that needs to be updated (e.g. aging data) in the login terminal data as necessity. More specifically, because the aging data is a data of the time elapsed from the receipt of a frame from the external terminal 30 that is connected, the aging data is cleared to be 0 (zero) each time a frame is received, and continued to be counted up until the arrival of a next frame.

(The Case where the External Terminal 30 is Connected to the Other Device)

In response to a login response for authorizing the login request transmitted from the authentication server 40 (see FIG. 1), the communication authorize processing section 55 transfers the response authorizing the login request to the other device (the first member device 22b) connected to the external terminal 30. Then, triggered by the transmission of the login terminal data transmitted from the other device (the first member device 22b) connected to the external terminal 30, the communication authorize processing section 55 performs the aforementioned communication authorize processing.

In addition, the communication authorize processing section 55 performs a login transmission processing. Here, the login transmission processing is performed when the external terminal 30 is connected to its own device, and the login transmission processing is not performed when the external terminal 30 is connected to the other device.

In the case where one network relay device (e.g. the master device 22a itself) is connected to the external terminal 30, the communication authorize processing section 55 performs the login transmission processing for sending the login terminal data to the other network relay devices (e.g. the first member device 22b and the second member device 22c) of the network system 20, after finishing the communication authorize processing.

(Communication Deny Processing Section)

A communication deny (non-authorization) processing section 56 performs a communication deny (non-authorization) processing. Similarly to the communication authorize processing, the processing steps in the communication non-authorization process is different between the case where the external terminal 30 is connected to the one network relay device itself and the case where the external terminal 30 is connected to the other network relay devices.

(The Case where the External Terminal 30 is Connected to its Own Device)

In response to a logout request (authentication termination request) transmitted from the external terminal 30 (see FIG. 1), the communication deny processing section 56 performs the communication deny processing for denying the communication between its own device and the external terminal 30. More specifically, the communication deny processing section 56 deletes the login terminal data registered in the communication administration DB 63, releases the connected VLAN, and releases the packet filter (i.e. performs the processing for configuring a communication disabled state). By deleting the login terminal data, it is possible to have the logged in external terminal 30 logout certainly.

(The Case where the External Terminal 30 is Connected to the Other Device)

In response to a logout terminal data (communication non-authorization data) transmitted from the other device connected to the external terminal 30, the communication deny processing section 56 is triggered by receipt of the logout terminal data to perform the aforementioned communication deny processing. Here, the logout terminal data includes identification data for identifying the external terminal 30 (e.g. data such as MAC address, IP address or user ID), so that the master device 22a which has received the logout terminal data can recognize which external terminal 30 logged out.

In addition, the communication deny processing section 56 performs logout transmission processing. Here, the logout transmission processing is performed when the external terminal 30 is connected to the one network relay device itself, and the logout transmission processing is not performed when the external terminal 30 is connected to the other device.

In the case where the one network relay device itself is connected to the external terminal 30, the communication deny processing section 56 performs the logout transmission processing for sending a logout terminal data to the other network relay device (the first member device 22b and the second member device 22c) of the network system 20, after finishing the communication deny processing.

(Port Administration Section)

The port administration section 57 administrates the status of each port. More specifically, in the case where the roaming port 24r is configured, the port administration section 57 registers the configuration (setting) of the roaming port 24r in the port administration DB 64 and transmits a roaming port data to the first member device 22b and the second member device 22c. Further, in the case where the roaming portion data indicating the configuration (setting) of the roaming port 24r is transmitted from the first member device 22b and the second member device 22c, the port administration section 57 registers the configuration of the roaming port 24r in the port administration DB 64. The configuration of the roaming port 24r is performed by e.g. an administrator of the network 10.

(Memory)

The memory 60 is a readable and writable storing device, which stores the FDB 61, the communication administration DB 63, and the port administration DB 64.

(FDB)

In the FDB 61, the port number of the port 24 and the MAC address are registered to be associated with each other. More specifically, in the FDB 61, the VID, the MAC address and the port number of the port 24 are registered as a set of registered contents that are associated with each other. The registered content of the FDB 61 is appropriately updated by the FDB administration section 51.

(Communication Administration DB)

The communication administration DB 63 stores various types of data when the communication authorize processing has been performed. More specifically, the communication administration DB 63 stores the login terminal data of the external terminal 30, the configuration (setting) details of the connected VLAN, and the configuration (setting) details of the packet filter.

(Port Administration DB)

The port administration DB 64 stores the port number (identification number) set for the roaming port 24r. Further, when the roaming port data is transmitted from the first member device 22b or the second member device 22c, the port administration DB 64 also stores the transmitted data.

(Member Device)

Figure 3:
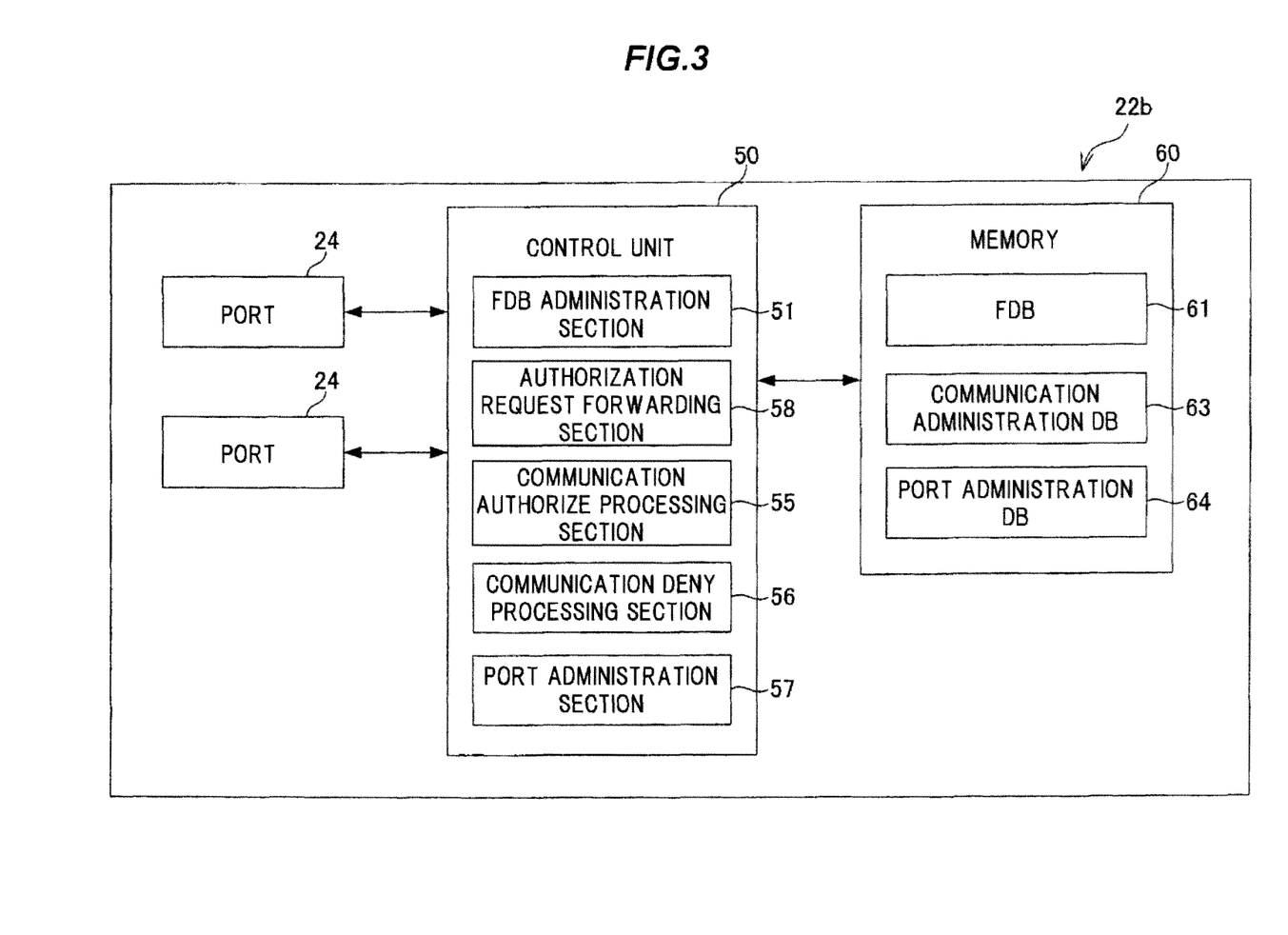
FIG. 3 is a block diagram showing a schematic configuration of a first member device 22b.

FIG. 3 is a block diagram schematically showing a configuration of the first member device 22b. In the following description, the same configuration as the master device 22a is appropriately omitted by using the same part names or the same reference numerals. Further, the explanation of the configuration of the second member device 22c will be omitted, since the second member device 22c has the same configuration as the first member device 22b.

The first member device 22b is different from the master device 22a, in that the network system administration section 53 and the authentication processing section 54 of the master device 22a are removed, and an authentication request forwarding section 58 is provided.

The reason why the network system administration section 53 is not provided in the first member device 22b is that the administration of the network system 20 is not required in the first member device 22b or the second member device 22c.

The reason why the authentication processing section 54 is not provided in the first member device 22b is that the authentication processing by itself is not required in the first member device 22b or the second member device 22c.

The authentication request forwarding section 58 forwards a login request to the master device 22a, when receiving the login request from the external terminal 30.

(Operation of the Whole System)

Next, the operations of respective devices belonging to the network 10 will be explained below.

Figure 4:
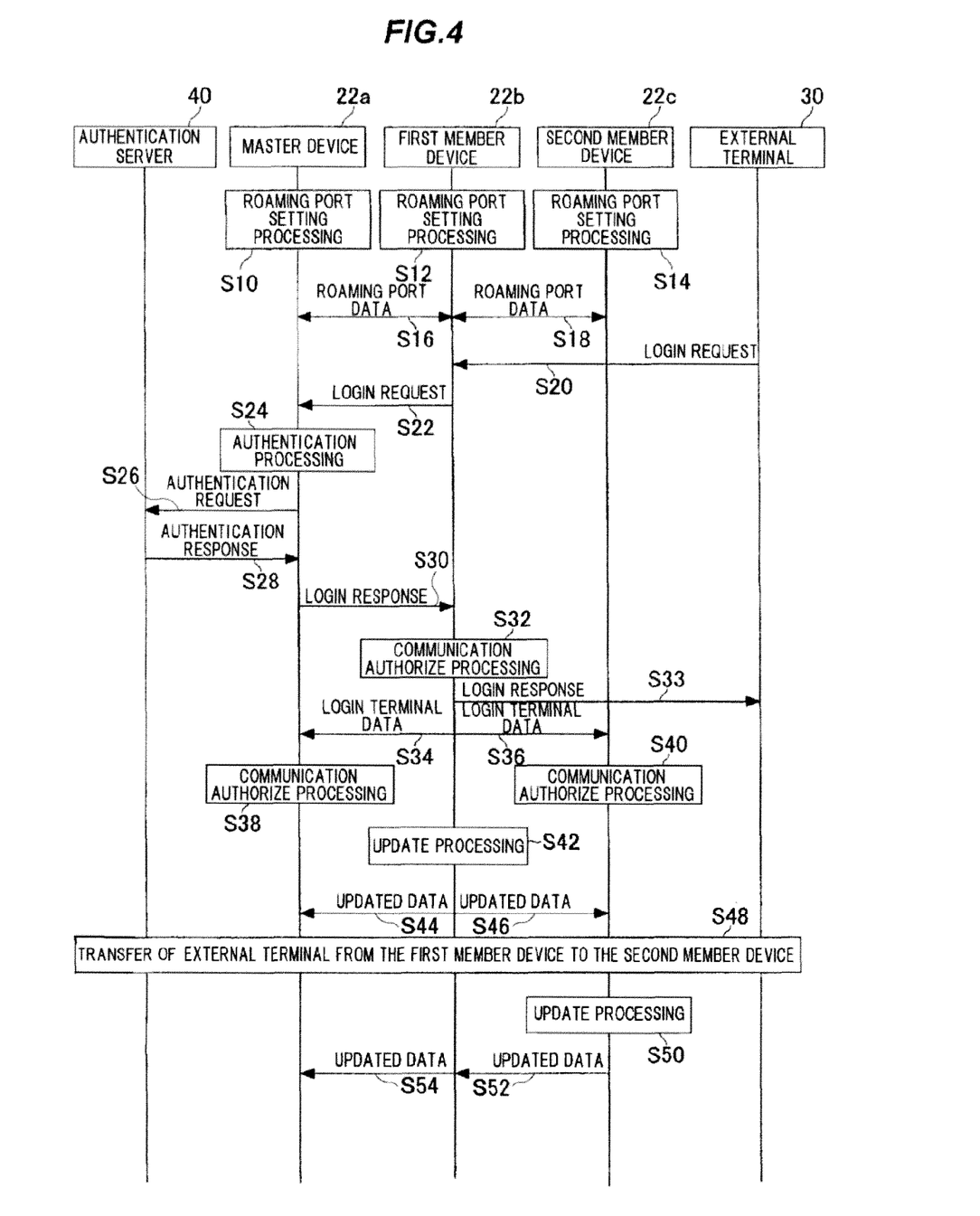
FIG. 4 is a sequential diagram for explaining the operation of the network system 20 at a login process.

FIG. 4 is a sequential diagram for explaining the operation of the network system 20 at the login process.

(Sharing of the Roaming Port Data)

When the setting of the roaming port 24r is done by the administrator of the network 10, the roaming port data is shared by the respective devices in the network 20 for each time. Here, it is assumed that the roaming port 24r is set in all of the master device 22a, the first member device 22b, and the second member device 22c.

At step S10, the master device 22a performs the roaming port setting processing. For example, the administrator can set (configure) the roaming port 24r by inputting a command to the master device 22a by using a predetermined input device.

Similarly to the master device 22a, the first member device 22b and the second member device 22c perform the roaming port setting processing, respectively (Step S12, Step S14).

After the roaming port setting processing is performed, data about the set (configured) roaming port 24r is notified to all the network relay devices of the network system 20 (Step S16, Step S18). For example, if the roaming port 24r is configured in the master device 22a, the data thereof will be notified to the first member device 22b and the second member device 22c. Also, if the roaming port 24r is configured in the first member device 22b, the data thereof will be notified to the master device 22a and the second member device 22c. Likewise, if the roaming port 24r is configured in the second member device 22c, the data thereof will be notified to the master device 22a and the first member device 22b. As a result, all the network relay devices belonging to the network system 20 can recognize the data of the roaming port 24r of the other network relay device.

(Login)

In the state prior to the login, the external terminal 30 is connected to the first member device 22b (see FIG. 1).

At step S20, the external terminal 30 transmits a login request to the first member device 22b.

At step S22, since the first member device 22b has no authentication processing section 54, the first member device 22b forwards the login request to the master device 22a from the authentication request forwarding section 58.

At steps S24 and S26, since the master device 22a includes the authentication processing section 54, as triggered by the receipt of the login request, the master device 22a sends a query of authentication to the authentication server 40 from the authentication processing section 54. More specifically, the master device 22a transmits an authentication request to the authentication server 40.

At step S28, the authentication server 40 determines whether to authorize or deny the authentication request, and transmits an authentication response to the master device 22a. Here, it is assumed that the authentication response indicating that the authentication request has been accepted is transmitted.

At step S30, since the master device 22a is not connected to the external terminal 30, the master device 22a transmits the login response to the first member device 22b.

At step S32, as triggered by the receipt of the login response, the first member device 22b performs a communication authorize processing. As described above, the communication authorize processing is a process for authorizing the communication between the own device and the external terminal 30. The first member device 22b also transmits a login response to the external terminal 30 (Step S33).

At steps S34 and S36, after the communication authorize processing is completed, the first member device 22b transmits a login terminal data to the master device 22a and the second member device 22c. Here, the first member device 22b references the port administration DB 64, then transmits a login terminal data only to the device having the roaming port 24r. In the present embodiment, since each of the master device 22a and the second member device 22c has the roaming port 24r, the first member device 22b transmits the login terminal data to the master device 22 and the second member device 22c. In the case where a third member device exists and the third member device does not have the roaming port 24r, the first member device 22b will not send the login terminal data to the third member device.

At step S38, the master device 22a performs the communication authorize processing as triggered by the receipt of the login terminal data.

As step S40, similarly to the master device 22a, the second member device 22c performs the communication authorize processing as triggered by the receipt of the login terminal data.

At step S42, when logged in, the external terminal 30 is connected to the first member device 22b. By occurrence of an update trigger of the data regarding the login terminal data, the first member device 22b performs an update processing of the data as necessity.

At steps S44 and S46, the first member device 22b transmits the data which is updated in the one network relay device itself but not updated in the other device (e.g. the aging data) to the other network relay devices 22 belonging to the network system 20 each time when such data is updated in the one network relay device itself. Here, the first member device 22b transmits the updated data to the master device 22a and the second member device 22c. The master device 22a and the second member device 22c can synchronize the login terminal data which has been updated in the first member device 22b by the use of the updated data. The first member device 22b references the port administration DB 64 then transmits the updated data only to the devices having the roaming port 24r. This is similar to the transmission of the login terminal data.

(Transfer of the External Terminal)

At step S48, it is assumed that the external terminal 30 is transferred (moves) from the first member device 22b to the second member device 22c. In this case, the login terminal data has been already transmitted to the second member device 22c at the step S36, and the communication authorize processing has been performed at the step S40. Therefore, it is possible to maintain the login state of the external terminal 30 without performing the login (request) again.

At step S50, since the external terminal 30 is connected to the second member device 22c, if the update trigger of the data regarding login terminal data occurs, the second member device 22c performs the update processing of the data as necessity.

At steps S52 and S54, the second member device 22c transmits the data which is updated in the one network relay device itself but not updated in the other device (e.g. the aging data) to the other network relay devices 22 belonging to the network system 20 each time when such data is updated in the one network relay device itself. Here, the second member device 22c transmits the updated data to the master device 22a and the first member device 22b. The master device 22a and the first member device 22b can synchronize the login terminal data which has been updated in the second member device 22c by the use of the updated data.

Figure 5:
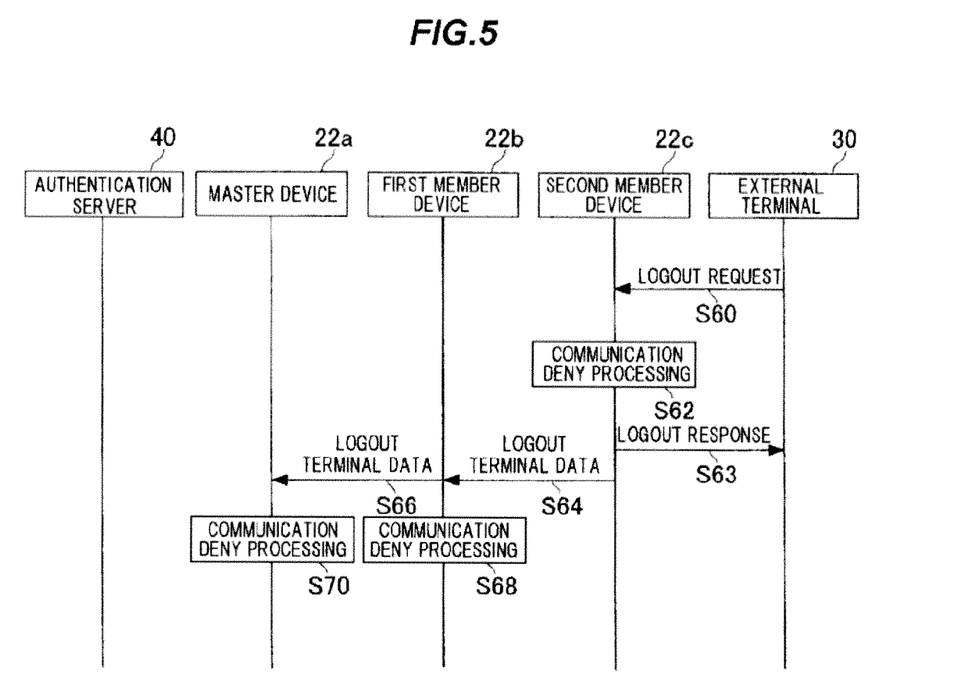
FIG. 5 is a sequential diagram for explaining the operation of the network system 20 at a logout process.

FIG. 5 is a sequential diagram for explaining the operation of the network system 20 at a logout process.

The external terminal 30 has been connected to the first member device 22b firstly, then transferred to the second member device 22c during the login state, and now is connected to the second member device 22c.

At step S60, in this case, a logout request is transmitted to the second member device 22c which is currently connected to the external terminal 30.

At step S61, the second member device 22c performs, as triggered by the receipt of the logout request, the communication deny processing. As described above, the communication deny processing is the processing for denying the communication between its own device (i.e. the second member device 22c) and the external terminal 30. In addition, the second member device 22c transmits the logout response to the external terminal 30 (Step S63).

At steps S64 and S66, after the communication deny processing is completed, the second member device 22c transmits the logout terminal data to the master device 22a and the first member device 22b. The second member device 22c references the port administration DI) 64 then transmits the logout terminal data only to the devices having the roaming port 24r. This is similar to the transmission of the login terminal data.

At step S68, the first member device 22b performs the communication deny processing as triggered by the receipt of the logout terminal data.

As step S70, similarly to the first member device 22b, the master device 22a performs the communication authorize processing as triggered by the receipt of the logout terminal data.

Effects of the First Embodiment

According to the first embodiment, the following effects would be achieved.

(1) When the login request is authorized, the login terminal data is also transmitted to the other network relay devices 22 of the network system 20. Therefore, even if the external terminal 30 which has been already logged in through the one network relay device transfers to the other network relay device 22, it is possible to continue the login state. Accordingly, in the network system 20, it is possible to achieve the roaming (inter-device transfer) of the external terminal 30 without performing the authentication processing again.

(2) When the network relay device 22 belonging to the network system 20 receives the logout request from the external terminal 30, the logout terminal data is transmitted also to the other network relay devices 22 of the network system 20. Therefore, if the logout processing is performed in the one network relay device 22 of the network system 20, the logout processing is similarly performed in the other network relay devices 22 of the network system 20. Accordingly, in the network system 20, it is possible to perform uniform (synchronized) logout processing (authentication processing).

(3) The first member device 22b or the second member device 22c connected to the external terminal 30 transmits the login terminal data, the update data, and the logout terminal data only to the network relay devices 2s having the roaming port 24r. Therefore, it is possible to reduce unnecessary communication.

(4) The network relay device 22 having the roaming port 24r transmits the data regarding to the roaming port 24r of its own device to the other network relay devices 22 belonging to the network system 20. Therefore, all the network relay devices 22 belonging to the network 20 can share the data of the roaming port 24r with each other.

(5) The network relay device 22 connected to the external terminal 30 transmits the updated data which is updated in its own device but not updated in the other device (e.g. the aging data) to the other network relay devices 22 belonging to the network system 20 each time such data is updated in its own device. Therefore, the updated data can be shared within the network system 20. In addition, it is possible to improve the consistency of the data, even for the data which is likely to be updated in accordance with the elapse of the time.

Second Embodiment

Figure 6:
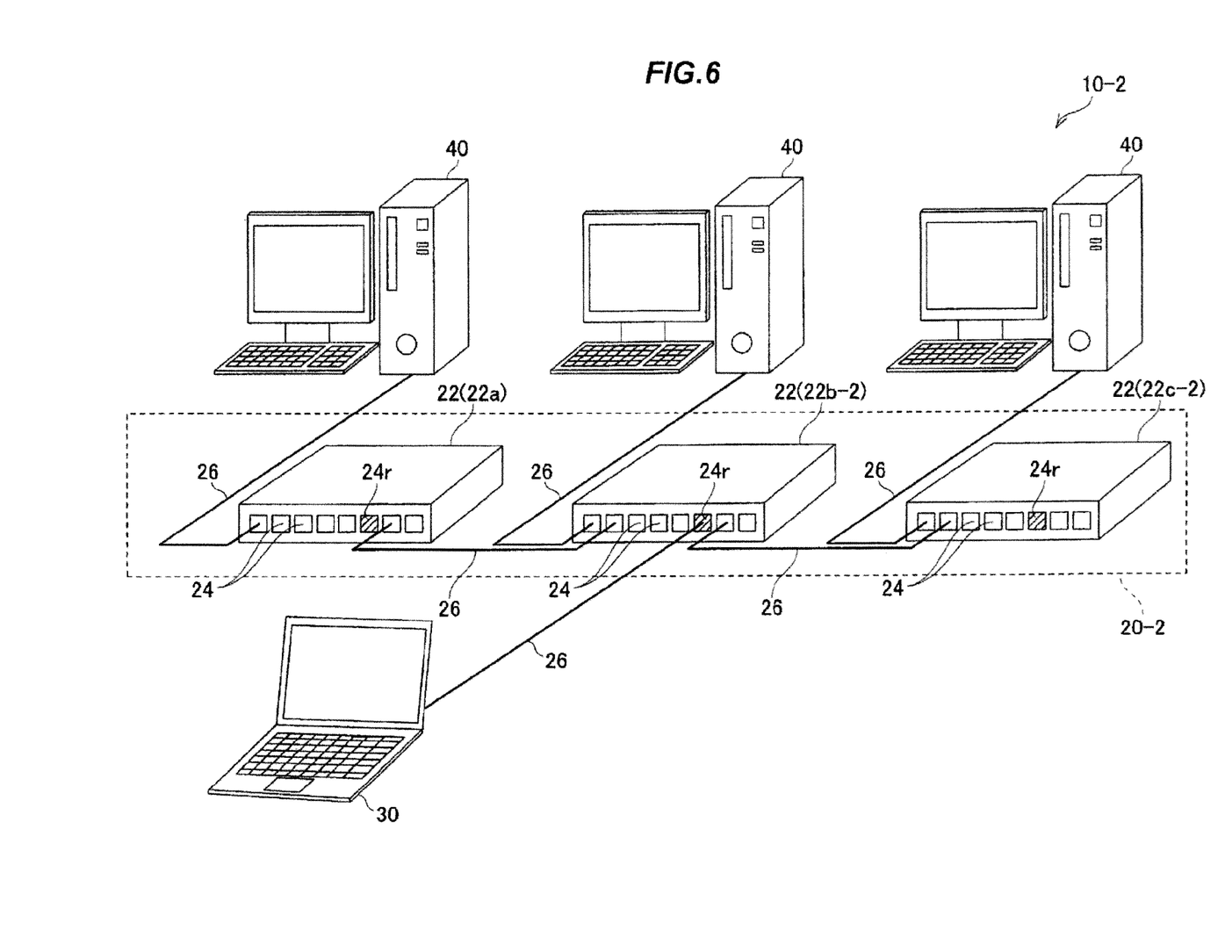
FIG. 6 is a diagram showing a network 10-2 including a network system 20-2 in the second embodiment according to the invention.

FIG. 6 is a diagram showing a network 10-2 including a network system 20-2 in the second embodiment according to the invention. In the following description, the same configuration as the first embodiment is appropriately omitted by using the same part names or the same reference numerals.

The network 10-2 in the second embodiment is different from the network system 10 in the first embodiment. In the network system 10 in the first embodiment, the master device 22a is connected to the authentication server 40. In the network system 10-2 in the second embodiment, the first member device 22b-2 and the second member device 22c-2 as well as the master device 22a are connected to the authentication server 40.

In FIG. 6, three authentication servers 40 are shown. The present invention is however not limited to the embodiment shown in FIG. 6. One authentication server 40 may be connected to all of the master device 22a, the first member device 22b-2 and the second member device 22c-2.

Figure 7:
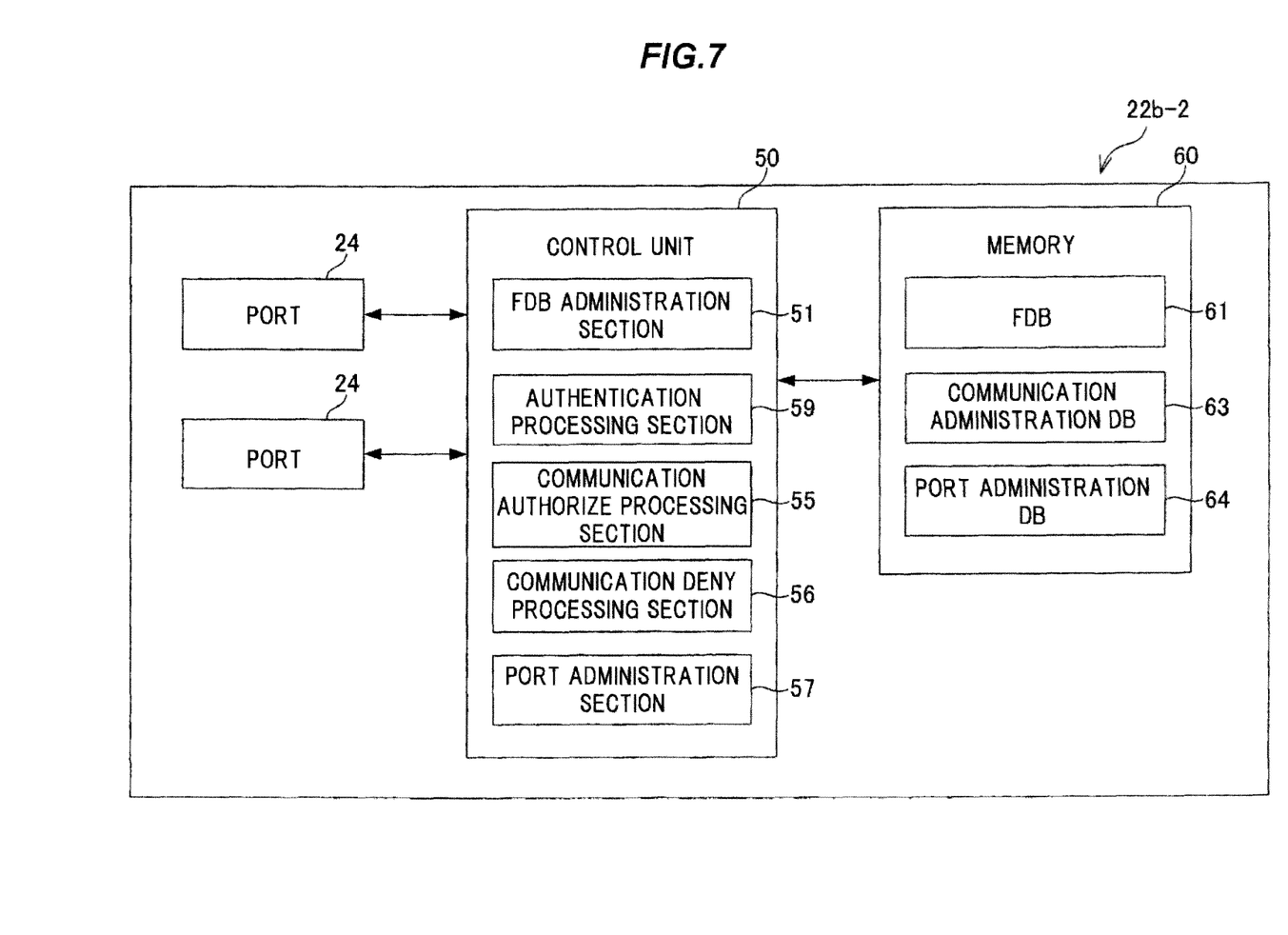
FIG. 7 is a block diagram schematically showing the configuration of the first member device 22b-2.

FIG. 7 is a block diagram schematically showing a configuration of the first member device 22b-2. In the following description, the same configuration of the first member device 22b-2 as the first member device 22b in the first embodiment is appropriately omitted by using the same part names or the same reference numerals. Further, the explanation of the configuration of the second member device 22c-2 will be omitted, since the second member device 22c-2 has the same configuration as the first member device 22b-2.

The first member device 22b-2 in the second embodiment is different from the first member device 22b in the first embodiment, in that the first member device 22b-2 includes an authentication processing section 59. Therefore, the first member device 22b-2 can perform the authentication processing by itself in response to the login request from the external terminal 30. Since the first member device 22b-2 can perform the authentication processing by itself: the first member device 22b-2 in the second embodiment does not include the authentication request forwarding section 58 (see FIG. 3).

(Operation of the Whole System)

Next, the operations of respective devices belonging to the network 10-2 will be explained below.

Figure 8:
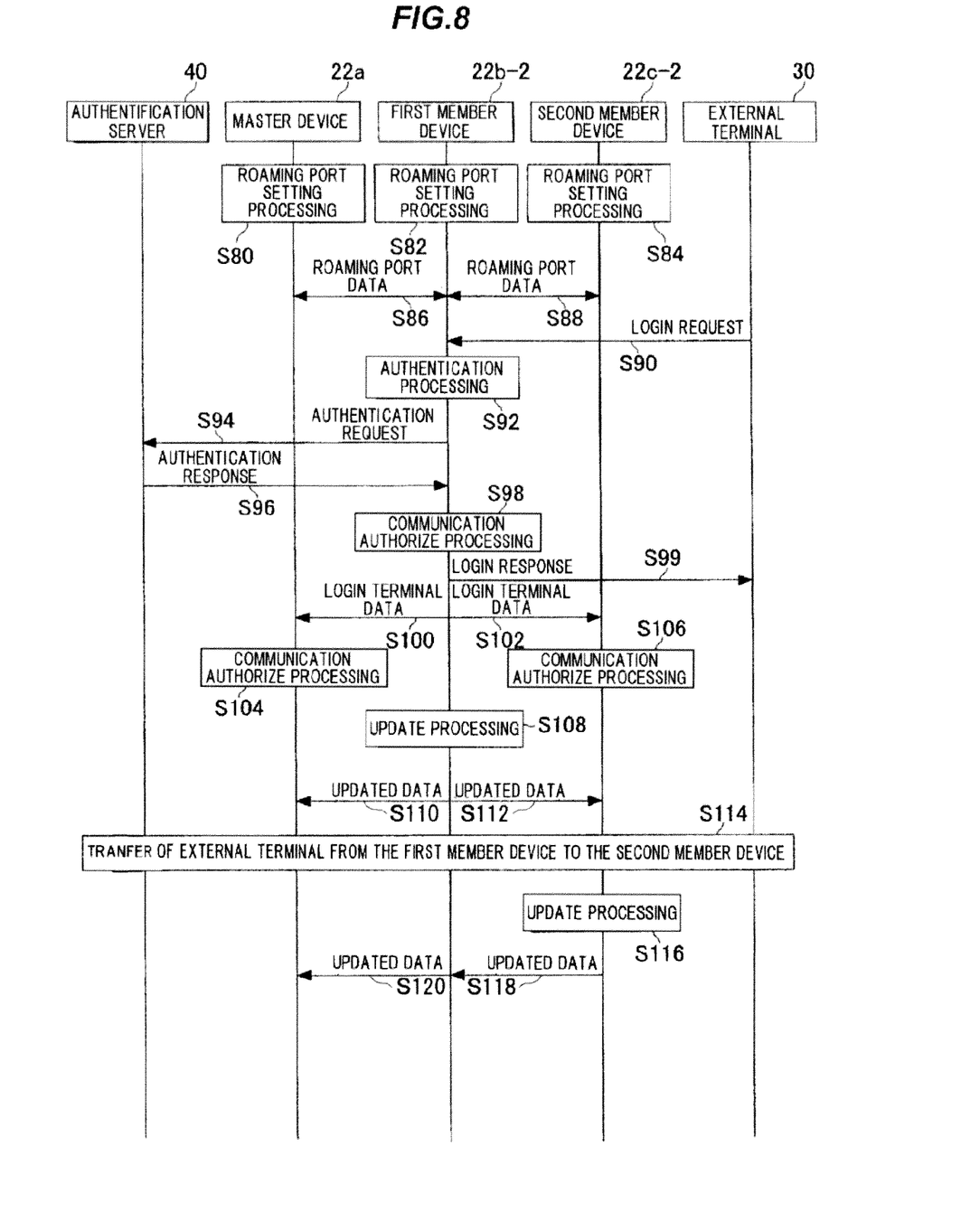
FIG. 8 is a sequential diagram for explaining the operation of the network system 20-2 at a login process.

FIG. 8 is a sequential diagram for explaining the operation of the network system 20-2 at the login process.

(Sharing of the Roaming Port Data)

At step S80, the master device 22a performs the roaming port setting processing.

Similarly to the master device 22a, the first member device 22b-2 and the second member device 22c-2 perform the roaming port setting processing, respectively (Step S82, Step S84).

After the roaming port setting processing is performed, the data about the configured (set) roaming port 24r is notified to all the network relay devices of the network system 20-2 (Step S86, Step S88). The operation until this step is similar to the operation in the first embodiment.

(Login)

In the state prior to the login, the external terminal 30 is connected to the first member device 22b-2 as shown in FIG. 6.

At Step S90, the external terminal 30 transmits a login request to the first member device 22b-2.

At steps S92 and S94, since the first member device 22b-2 has the authentication processing section 59, the first member device 22b transmits the query of the authentication (i.e. transmits the login request) directly to the authentication server 40. Namely, the first member device 22b-2 performs the authentication processing instead of the master device 22a. More specifically, the first member device 22b-2 transmits an authentication request to the authentication server 40.

At step S96, the authentication server 40 determines whether to accept or deny the authentication request, and transmits an authentication response to the first member device 22b-2. Here, it is assumed that the authentication response indicating that the authentication request has been accepted is transmitted.

At step S98, as triggered by the receipt of the authentication response, the first member device 22b-2 performs a communication authorize processing. As described above, the communication authorize processing is a process for authorizing the communication between its own device and the external terminal 30. The first member device 22b-2 also transmits a login response to the external terminal 30 (Step S99).

At steps S100 and S102, after the communication authorize processing is completed, the first member device 22b-2 transmits a login terminal data to the master device 22a and the second member device 22c-2.

At step S104, the master device 22a performs the communication authorize processing as triggered by the receipt of the login terminal data.

As step S106, during the login, the external terminal 30 is connected to the first member device 22b-2. By occurrence of an update trigger of the data regarding the login terminal data, the first member device 22b-2 performs an update processing of the data as necessity.

At steps S110 and S112, the first member device 22b-2 transmits the data which is updated in its own device but not updated in the other device (e.g. the aging data) to the other network relay devices 22 belonging to the network system 20-2 each time such data is updated in its own device. Here, the first member device 22b-2 transmits the update data to the master device 22a and the second member device 22c-2. The master device 22a and the second member device 22c-2 can synchronize the login terminal data which has been updated in the first member device 22b-2 by the use of the updated data.

(Transfer of the External Terminal)

At step S114, it is assumed that the external terminal 30 transfers (moves) from the first member device 22b-2 to the second member device 22c-2. In this case, the login terminal data has been already transmitted to the second member device 22c-2 at the step S102, and the communication authorize processing has been performed at the step S106. Therefore, it is possible to maintain the login state of the external terminal 30 without performing the login (request) again.

At step S116, since the external terminal 30 is connected to the second member device 22c-2, if the update trigger of the data regarding login terminal data occurs, the second member device 22c-2 performs the update processing of the data as necessity.

At steps S118 and S120, the second member device 22c-2 transmits the data which is updated in its own device but not updated in the other device (e.g. the aging data) to the other network relay devices 22 belonging to the network system 20-2 each time such data is updated in its own device. Here, the second member device 22c-2 transmits the update data to the master device 22a and the first member device 22b-2. The master device 22a and the first member device 22b-2 can synchronize the login terminal data which has been updated in the second member device 22c-2 by the use of the update data.

Thus, according to the second embodiment, when receiving the login request from the external terminal 30, the first member device 22b-2 or the second member device 22c-2 performs the authentication processing instead of the master device 22a. Therefore, the authentication process is not performed collectively by the master device 22a, but performed by each device to which the external terminal 30 is connected.

Thus, it is possible to distribute the processing load of the authentication process, thereby to reduce the processing load on the master device 22a due to the centralized authentication processing.

In the second embodiment, the authentication processing among the role of the master device 22a is performed by the other member devices 22b-2, 22c-2, to reduce the processing load of the authentication processing on the master device 22a. In this regard, the authentication processing may provide a greater processing load depending on the time zone for using the network system 20-2. For example, at the starting time of college classes, the opening of the company or the like, a large number of external terminals 30 may start the authentication processing all at once. In this case, it is assumed that the number of authentication processing will be increased temporarily, and that the processing load on the master device 22 will be increased only during this period. In other words, although it is temporarily, the authentication processing is a phenomenon which tends to concentrate the load. Thus, in the second embodiment, the authentication processing is performed by not only the master device 22a but also the other member devices 22b-2, 22c-2. According to this structure, it is possible to distribute the processing load of the authentication processing, reduce the processing load on the master device 22a, and improve the quality of the entire network 10-2.

The present invention is not limited to the embodiments described above, and can be carried out with various modifications and substitutions. For example, the number of network relay devices constituting the network system, the number of ports and the like are intended only to show examples, and the present invention is not limited thereto.

In the above embodiments, an example in which the login terminal data, update data, and logout terminal data are transmitted only to the device having the roaming port 24r of the network relay devices 22 belonging to the network system 20, 20-2 has been described.

The login terminal data and the like may be transmitted to the device having no roaming port 24r. In this case, if the device having no roaming port 24r receives the login terminal data or the like, the device having no roaming ports 24r will discard such data and not perform the processing such as communication authorize processing. By adopting such a configuration, when sending the login terminal data or the like from the transmitting side, it is possible to send the login terminal data or the like to the network relay devices 22 belonging to the network system 20, 20-2 simultaneously. Therefore, it is not necessary to share the roaming port data prior to the transmission, so that it is possible to reduce the processing load on the transmission side.

The data contained in the login terminal data, update data, logout terminal data and the like are shown as examples only, it is possible to modify, increase or decrease appropriately according to the specifications of the system.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A network system of a network, comprising:
network relay devices connected to each other to function as a virtual single network relay device, the network relay devices including:
a master device configured to administrate the network system; and
one or more member devices configured to be administrated by the master device, and
an authentication server connected to the master device,
wherein one of the network relay devices is connected with one or more external terminals,
wherein when an external terminal of the one or more external terminals logins the network, the external terminal sends a login request to the master device relayed by one or more member devices,
wherein when the master device receives the login request from the external terminal connected to the network system, the master device sends an authentication request to the authentication server and receives a response to the authentication request from the authentication server, and the master device sends a response to the login request to the external terminal,
wherein when the authentication server receives the authentication request from the master device, the authentication server authenticates or denies the authentication request,
wherein when the authentication request is authenticated, the one network relay device connected to the external terminal enables a communication between the external terminal and the one network relay device, and transmits enabled communication information to the other network relay devices belonging to the network system,
wherein the other network relay devices, when receiving the enabled communication information, enable communications between the external terminal and the other network relay devices, respectively,
wherein at least one of the network relay devices includes a roaming port to be connected to the external terminal when the external terminal roams, and the one network relay device connected with the external terminal transmits the enabled communication information to only the at least one network relay device with a roaming port, but not to the other network relay devices with no roaming port, and
wherein the at least one network relay device with a roaming port transmits information of the roaming port to the other network relay devices belonging to the network system.

2. The network system according to claim 1, wherein when the one or more member devices receive the login request from the external terminal, the one or more member devices send the authentication request to the authentication server and receive the response to the authentication request from the authentication server instead of the master device.

3. The network system according to claim 1, wherein when the one network relay device connected with the external terminal receives a logout request from the external terminal, the one network relay device disables the communication between the external terminal and the one network relay device, and transmits communication disabling information to the other network relay devices belonging to the network system,
wherein when the other network relay devices not connected with the external terminal, when receiving the communication disabling information, disable the communications between the external terminal and the other network relay devices, respectively.

4. The network system according to claim 3, wherein each of the network relay devices registers an external terminal identification information therein when executing the communication-enabling processing, and deletes the external terminal identification information therefrom when executing the communication-disabling processing.

5. The network system according to claim 1, wherein the one network relay device connected with the external terminal transmits an updated information to the other network relay devices belonging to the network system each time the information to be updated in the one network relay device but not updated in the other network relay devices is updated in the one network relay device.

6. The network system according to claim 1, wherein the enabled communication information comprises information of the external terminal for which the communications with the other network relay devices are authorized.

7. The network system according to claim 1, wherein the enabled communication information comprises login terminal data including information of the external terminal for which communication is authorized.

* * * * *